US012646201B2

(12) United States Patent
Planche et al.

(10) Patent No.: US 12,646,201 B2
(45) Date of Patent: Jun. 2, 2026

(54) PREDICTING A POSITION OF AN OBJECT OVER TIME

(71) Applicant: Shanghai United Imaging Intelligence Co., Ltd., Shanghai (CN)

(72) Inventors: Benjamin Planche, Briarwood, NY (US); Ziyan Wu, Lexington, MA (US); Meng Zheng, Cambridge, MA (US); Zhongpai Gao, Rowley, MA (US); Abhishek Sharma, Boston, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 270 days.

(21) Appl. No.: 18/480,665

(22) Filed: Oct. 4, 2023

(65) Prior Publication Data

US 2025/0117959 A1 Apr. 10, 2025

(51) Int. Cl.
G06K 9/00 (2022.01)
G06T 7/70 (2017.01)

(52) U.S. Cl.
CPC ...... G06T 7/70 (2017.01); G06T 2207/30196 (2013.01)

(58) Field of Classification Search
CPC . G06T 2207/10081; G06T 2207/10088; G06T 2207/20076; G06T 2207/30196; G06T 7/70
See application file for complete search history.

(56) References Cited

U.S. PATENT DOCUMENTS

| | | | |
|---|---|---|---|
| 8,160,334 B2 | 4/2012 | Thiel et al. | |
| 9,437,009 B2 | 9/2016 | Medioni et al. | |

| | | | |
|---|---|---|---|
| 10,269,147 B2 | 4/2019 | Jones et al. | |
| 2018/0268256 A1 | 9/2018 | Febbo et al. | |
| 2019/0130602 A1* | 5/2019 | Hall | G06T 7/74 |
| 2020/0082635 A1* | 3/2020 | Zhu | G06T 7/248 |
| 2020/0202554 A1* | 6/2020 | Malisiewicz | G06V 30/19173 |
| 2020/0242505 A1* | 7/2020 | Raz | G06N 20/00 |
| 2020/0387797 A1 | 12/2020 | Ryan et al. | |
| 2021/0090284 A1* | 3/2021 | Ning | G06V 10/82 |

(Continued)

FOREIGN PATENT DOCUMENTS

| | | |
|---|---|---|
| CN | 102881024 B | 1/2013 |
| CN | 107004275 A | 8/2017 |

(Continued)

OTHER PUBLICATIONS

Planche et al., U.S. Appl. No. 17/897,465, filed Aug. 29, 2022.

*Primary Examiner* — Hadi Akhavannik
(74) *Attorney, Agent, or Firm* — Zhong Law, LLC

(57) ABSTRACT

Multiple predictions about the position of an object during a time period may each indicate the position of the object at a respective time during the time period. Respective validity indications corresponding to the multiple predictions may each indicate an accuracy of the corresponding prediction. Whether a change has occurred in a distribution of the predictions from a first subset of predictions to a second subset of predictions during the time period may be determined. If the change has occurred, a prediction from the first subset of predictions or the second subset of predictions may be selected, based on the validity of the predictions and/or the detection of a motion, as a best indication of the position of the object.

17 Claims, 6 Drawing Sheets

(56)  References Cited

U.S. PATENT DOCUMENTS

| | | | | |
|---|---|---|---|---|
| 2022/0237815 A1* | 7/2022 | Malisiewicz | .......... | G06N 3/084 |
| 2023/0063926 A1* | 3/2023 | Zhang | .................... | G06V 10/22 |
| 2023/0135787 A1* | 5/2023 | Peleg | ..................... | G09G 3/001 |
| 2023/0139337 A1* | 5/2023 | Noam | ................... | G06F 3/0231 |
| | | | | 345/156 |

FOREIGN PATENT DOCUMENTS

| | | | |
|---|---|---|---|
| CN | 111738220 A | 10/2020 |
| KR | 20080105698 A | 12/2008 |
| WO | 2021051526 A1 | 3/2021 |

* cited by examiner

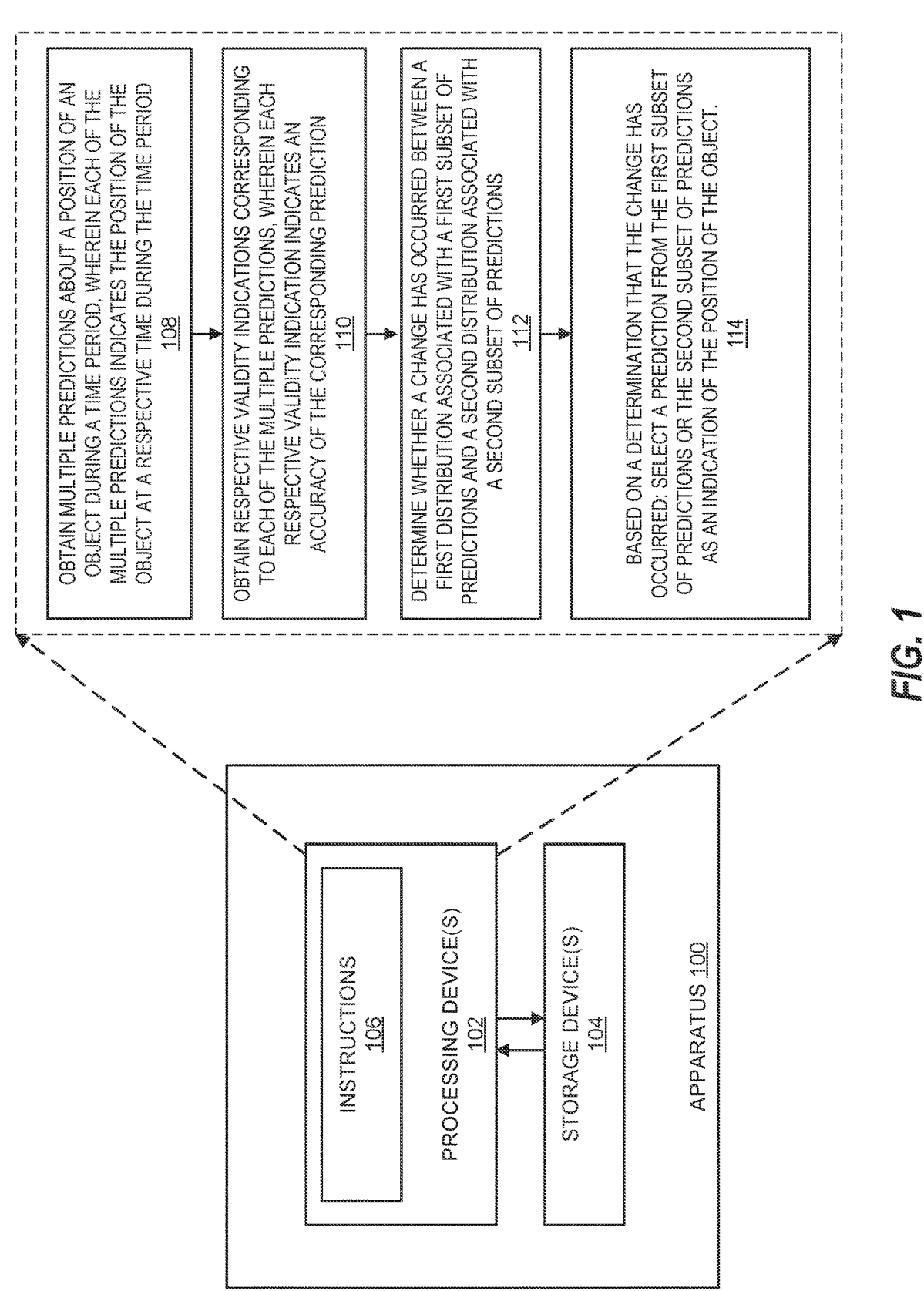

OBTAIN MULTIPLE PREDICTIONS ABOUT A POSITION OF AN OBJECT DURING A TIME PERIOD, WHEREIN EACH OF THE MULTIPLE PREDICTIONS INDICATES THE POSITION OF THE OBJECT AT A RESPECTIVE TIME DURING THE TIME PERIOD
108

OBTAIN RESPECTIVE VALIDITY INDICATIONS CORRESPONDING TO EACH OF THE MULTIPLE PREDICTIONS, WHEREIN EACH RESPECTIVE VALIDITY INDICATION INDICATES AN ACCURACY OF THE CORRESPONDING PREDICTION
110

DETERMINE WHETHER A CHANGE HAS OCCURRED BETWEEN A FIRST DISTRIBUTION ASSOCIATED WITH A FIRST SUBSET OF PREDICTIONS AND A SECOND DISTRIBUTION ASSOCIATED WITH A SECOND SUBSET OF PREDICTIONS
112

BASED ON A DETERMINATION THAT THE CHANGE HAS OCCURRED: SELECT A PREDICTION FROM THE FIRST SUBSET OF PREDICTIONS OR THE SECOND SUBSET OF PREDICTIONS AS AN INDICATION OF THE POSITION OF THE OBJECT.
114

INSTRUCTIONS
106

PROCESSING DEVICE(S)
102

STORAGE DEVICE(S)
104

APPARATUS 100

FIG. 1

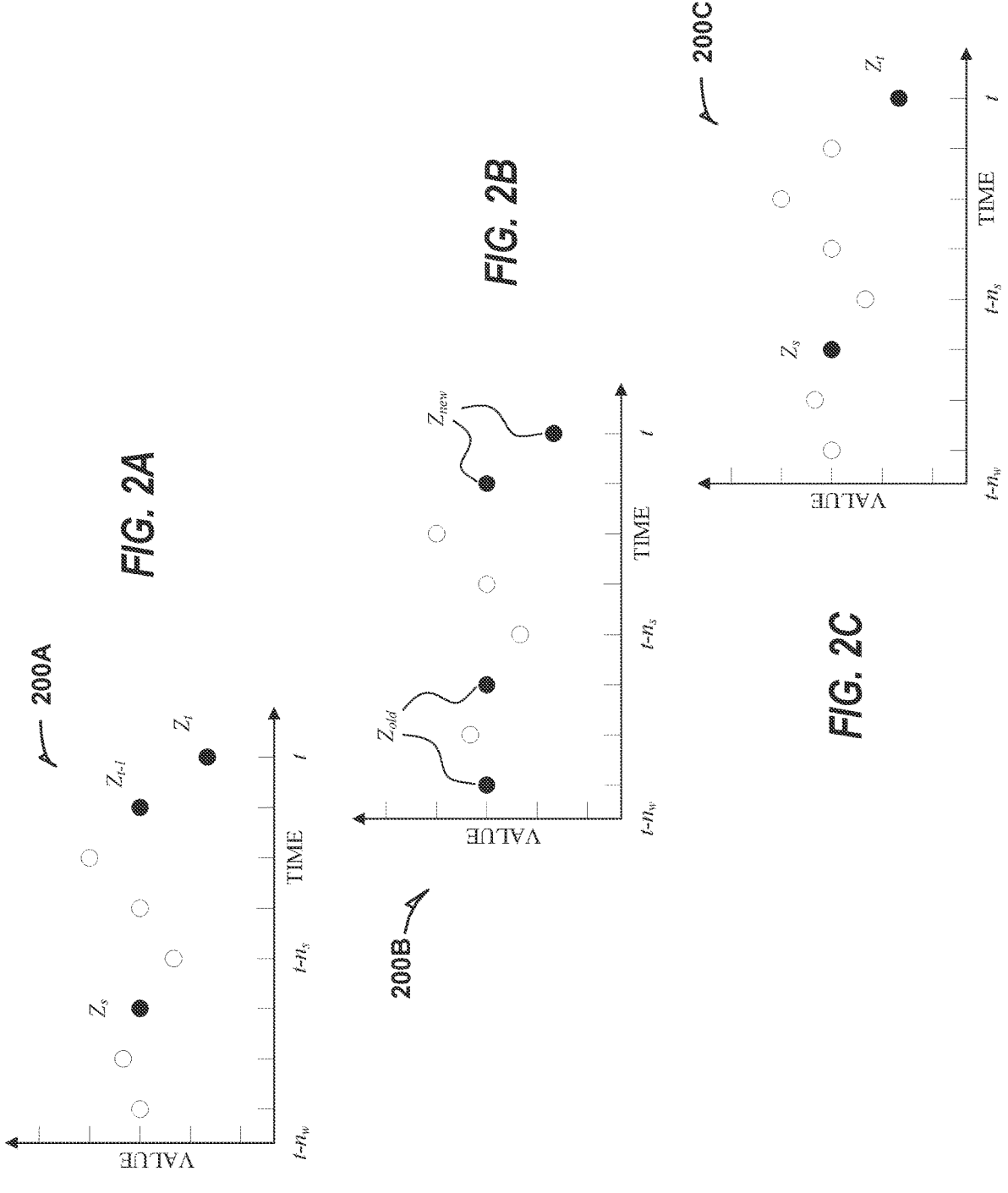

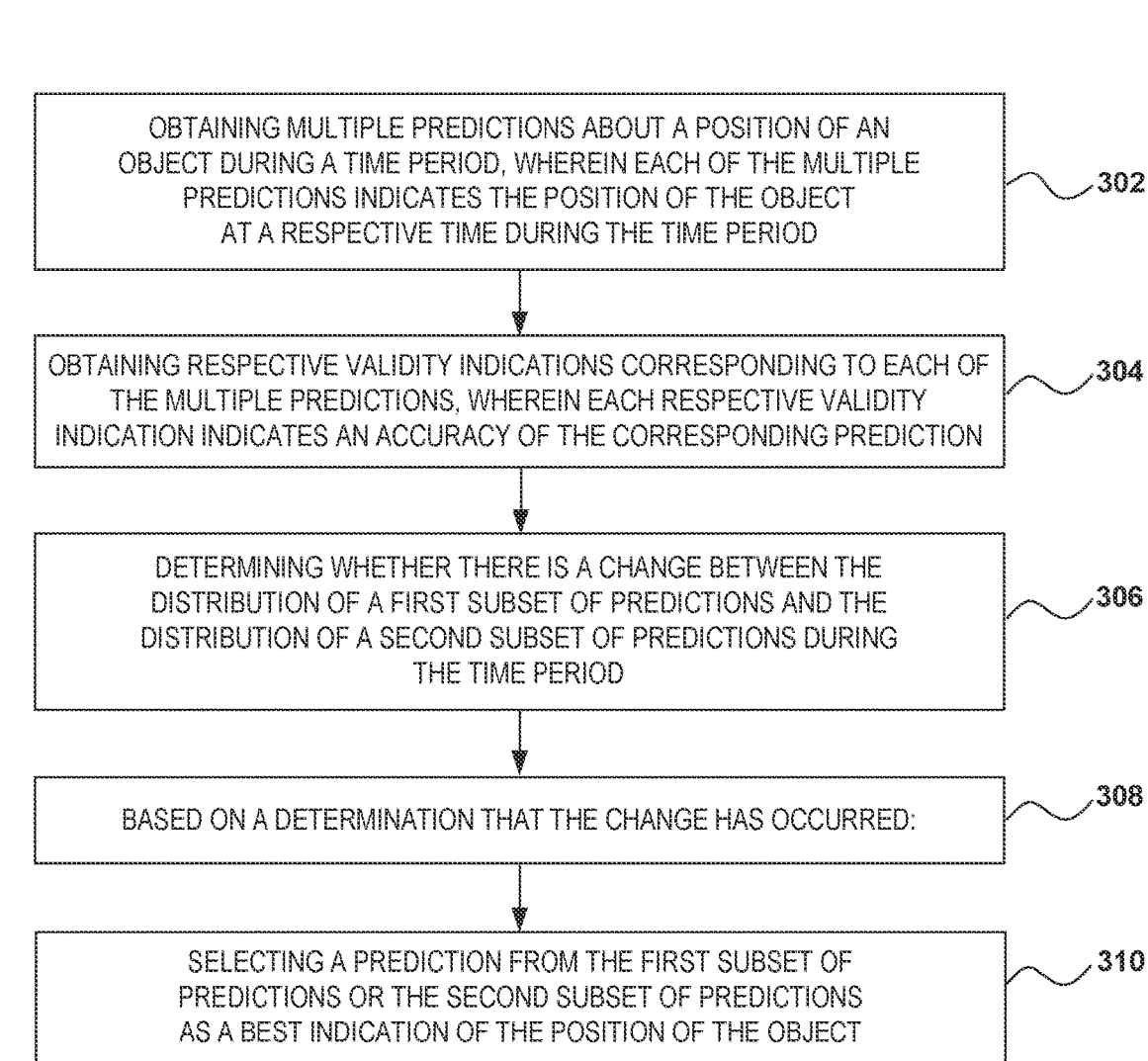

300

OBTAINING MULTIPLE PREDICTIONS ABOUT A POSITION OF AN OBJECT DURING A TIME PERIOD, WHEREIN EACH OF THE MULTIPLE PREDICTIONS INDICATES THE POSITION OF THE OBJECT AT A RESPECTIVE TIME DURING THE TIME PERIOD — 302

OBTAINING RESPECTIVE VALIDITY INDICATIONS CORRESPONDING TO EACH OF THE MULTIPLE PREDICTIONS, WHEREIN EACH RESPECTIVE VALIDITY INDICATION INDICATES AN ACCURACY OF THE CORRESPONDING PREDICTION — 304

DETERMINING WHETHER THERE IS A CHANGE BETWEEN THE DISTRIBUTION OF A FIRST SUBSET OF PREDICTIONS AND THE DISTRIBUTION OF A SECOND SUBSET OF PREDICTIONS DURING THE TIME PERIOD — 306

BASED ON A DETERMINATION THAT THE CHANGE HAS OCCURRED: — 308

SELECTING A PREDICTION FROM THE FIRST SUBSET OF PREDICTIONS OR THE SECOND SUBSET OF PREDICTIONS AS A BEST INDICATION OF THE POSITION OF THE OBJECT — 310

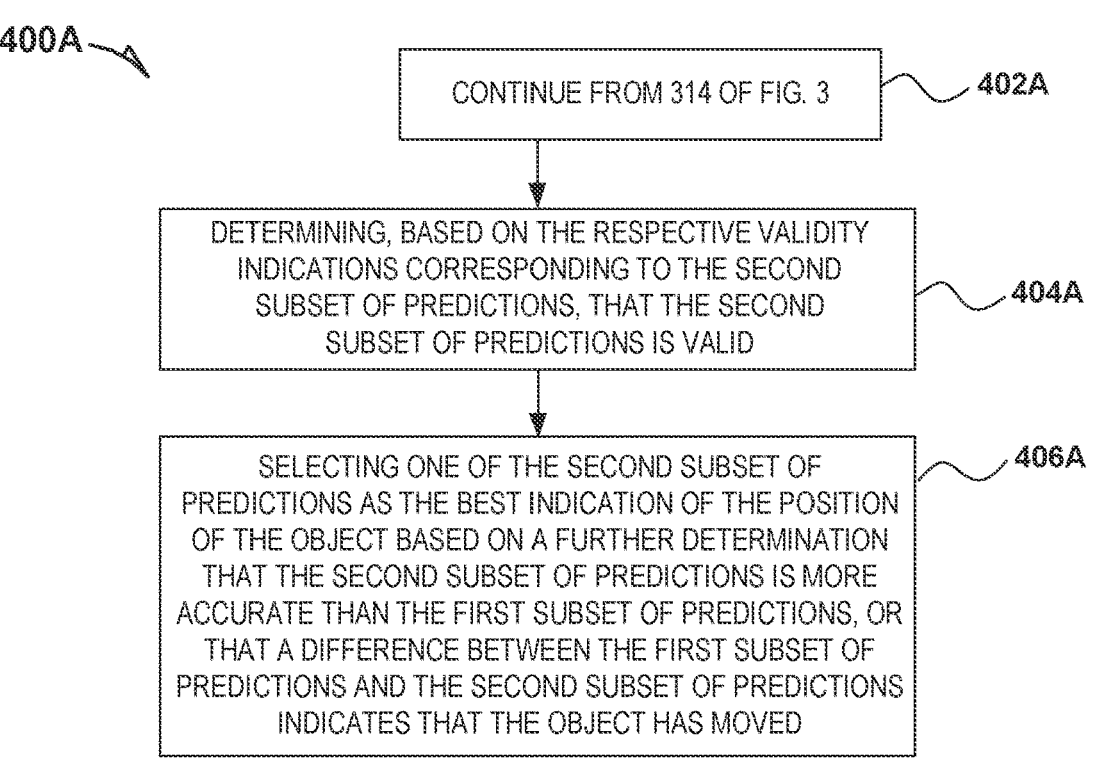

CONTINUE FROM 314 OF FIG. 3 — 402A

DETERMINING, BASED ON THE RESPECTIVE VALIDITY INDICATIONS CORRESPONDING TO THE SECOND SUBSET OF PREDICTIONS, THAT THE SECOND SUBSET OF PREDICTIONS IS VALID — 404A

SELECTING ONE OF THE SECOND SUBSET OF PREDICTIONS AS THE BEST INDICATION OF THE POSITION OF THE OBJECT BASED ON A FURTHER DETERMINATION THAT THE SECOND SUBSET OF PREDICTIONS IS MORE ACCURATE THAN THE FIRST SUBSET OF PREDICTIONS, OR THAT A DIFFERENCE BETWEEN THE FIRST SUBSET OF PREDICTIONS AND THE SECOND SUBSET OF PREDICTIONS INDICATES THAT THE OBJECT HAS MOVED — 406A

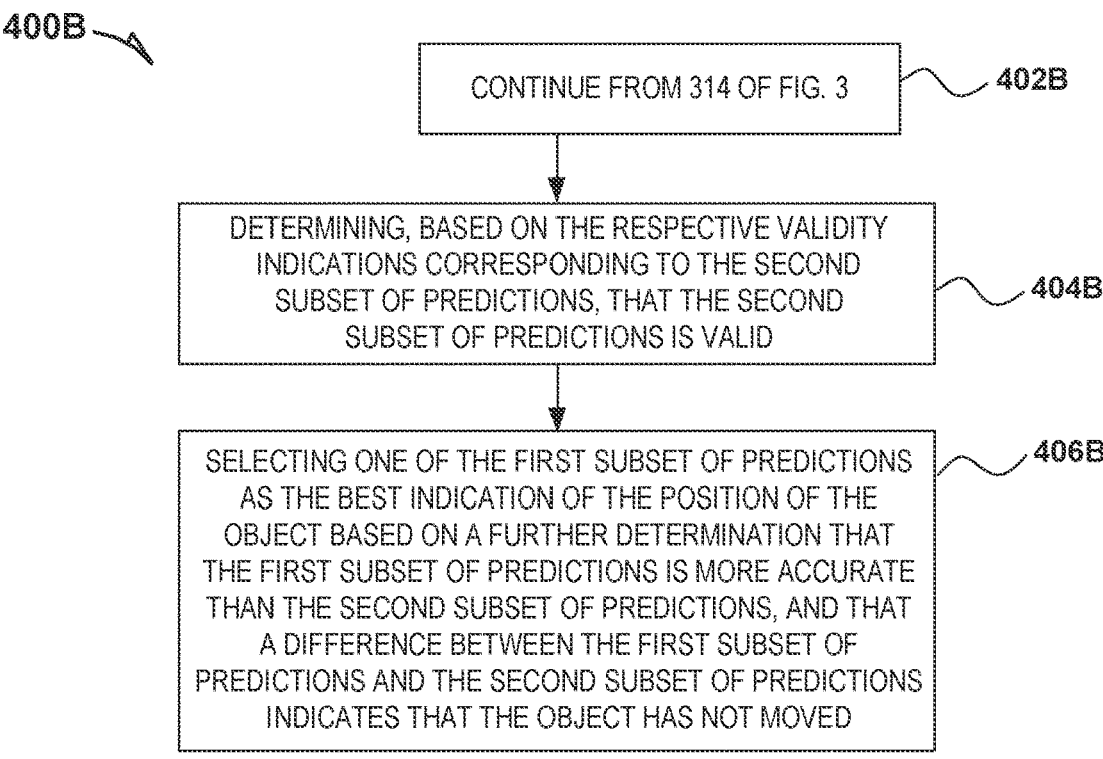

CONTINUE FROM 314 OF FIG. 3 — 402B

DETERMINING, BASED ON THE RESPECTIVE VALIDITY INDICATIONS CORRESPONDING TO THE SECOND SUBSET OF PREDICTIONS, THAT THE SECOND SUBSET OF PREDICTIONS IS VALID — 404B

SELECTING ONE OF THE FIRST SUBSET OF PREDICTIONS AS THE BEST INDICATION OF THE POSITION OF THE OBJECT BASED ON A FURTHER DETERMINATION THAT THE FIRST SUBSET OF PREDICTIONS IS MORE ACCURATE THAN THE SECOND SUBSET OF PREDICTIONS, AND THAT A DIFFERENCE BETWEEN THE FIRST SUBSET OF PREDICTIONS AND THE SECOND SUBSET OF PREDICTIONS INDICATES THAT THE OBJECT HAS NOT MOVED — 406B

*FIG. 4B*

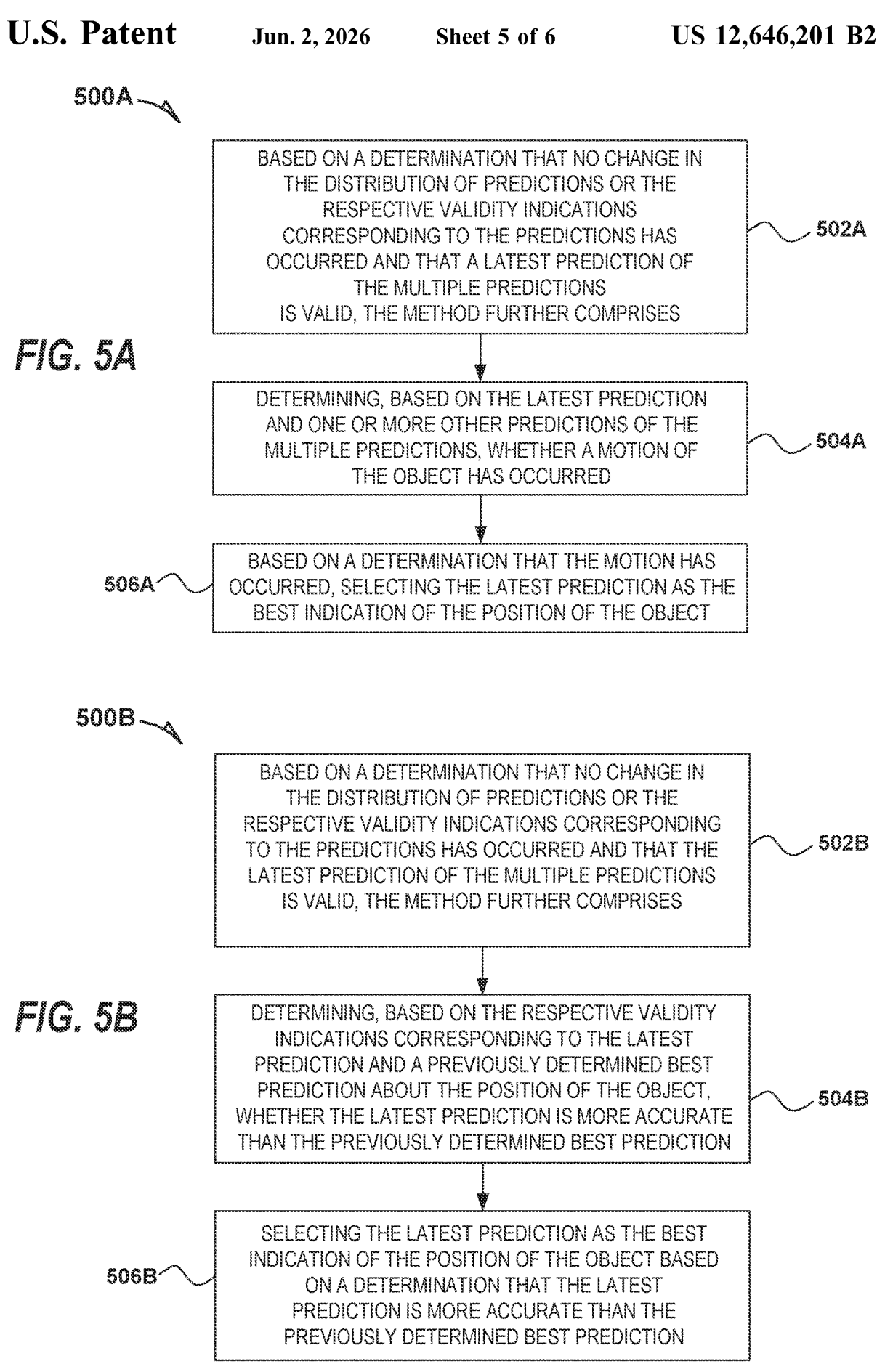

500A

BASED ON A DETERMINATION THAT NO CHANGE IN THE DISTRIBUTION OF PREDICTIONS OR THE RESPECTIVE VALIDITY INDICATIONS CORRESPONDING TO THE PREDICTIONS HAS OCCURRED AND THAT A LATEST PREDICTION OF THE MULTIPLE PREDICTIONS IS VALID, THE METHOD FURTHER COMPRISES — 502A

*FIG. 5A*

DETERMINING, BASED ON THE LATEST PREDICTION AND ONE OR MORE OTHER PREDICTIONS OF THE MULTIPLE PREDICTIONS, WHETHER A MOTION OF THE OBJECT HAS OCCURRED — 504A

506A — BASED ON A DETERMINATION THAT THE MOTION HAS OCCURRED, SELECTING THE LATEST PREDICTION AS THE BEST INDICATION OF THE POSITION OF THE OBJECT

500B

BASED ON A DETERMINATION THAT NO CHANGE IN THE DISTRIBUTION OF PREDICTIONS OR THE RESPECTIVE VALIDITY INDICATIONS CORRESPONDING TO THE PREDICTIONS HAS OCCURRED AND THAT THE LATEST PREDICTION OF THE MULTIPLE PREDICTIONS IS VALID, THE METHOD FURTHER COMPRISES — 502B

*FIG. 5B*

DETERMINING, BASED ON THE RESPECTIVE VALIDITY INDICATIONS CORRESPONDING TO THE LATEST PREDICTION AND A PREVIOUSLY DETERMINED BEST PREDICTION ABOUT THE POSITION OF THE OBJECT, WHETHER THE LATEST PREDICTION IS MORE ACCURATE THAN THE PREVIOUSLY DETERMINED BEST PREDICTION — 504B

506B — SELECTING THE LATEST PREDICTION AS THE BEST INDICATION OF THE POSITION OF THE OBJECT BASED ON A DETERMINATION THAT THE LATEST PREDICTION IS MORE ACCURATE THAN THE PREVIOUSLY DETERMINED BEST PREDICTION

PREDICTING A POSITION OF AN OBJECT OVER TIME

BACKGROUND

Motion detection can play an important role in the medical field because the ability to ascertain and track the position (e.g., a three dimensional (3D) position) of a target object, such as a person or a body part of the person, may be crucial to the success of many medical applications or procedures including, for example, computed tomography (CT) or magnetic resonance imaging (MRI) scanning where a failure to detect a movement of the target object may significantly reduce the scan quality of the CT or MRI. However, a medical environment may involve "noisy" conditions for tracking the position of the target object. For example, the medical environment may include many other moving objects which may occlude some portion of the target object or even confuse some position tracking methods causing sensing errors and/or algorithmic uncertainty over time. As another example, due to detection challenges, approximations, etc., it may be difficult to distinguish the actual motion of a patient versus 2D or 3D prediction noise. These prediction or detection noises may be constant in the medical environment and may become heavier in some challenging scenarios (e.g., 3D position predictions may vary significantly from one timestep to another), whereas patient motion may be less frequent but important not to miss. Accordingly, systems, methods, instrumentalities are desired for improving the quality and efficiency of conventional position tracking methods.

SUMMARY

Disclosed herein are apparatus and methods associated with predicting the position of an object (e.g., person or body part) over time. According to embodiments of the present disclosure, an apparatus may be configured to obtain multiple predictions about a position of an object during a time period, wherein each of the multiple predictions indicates the position of the object at a respective time during the time period. The apparatus may also obtain respective validity indications corresponding to the multiple predictions, wherein each respective validity indication indicates an accuracy of the corresponding prediction. The apparatus may then select a first subset of predictions and a second subset of predictions from the multiple predictions and determine whether a change has occurred between a first statistical distribution associated with the first subset of predictions and a second statistical distribution associated with the second subset of predictions. Based on a determination that the change has occurred between the first statistical distribution and the second statistical distribution, the apparatus may select a prediction from the first subset of predictions or the second subset of predictions as an indication of the position of the object.

In some embodiments, the apparatus may determine, based on the respective validity indications corresponding to the second subset of predictions, that the second subset of predictions is valid and select one of the second subset of predictions as the indication of the position of the object based on a further determination that the second subset of predictions is more accurate than the first subset of predictions or that a difference between the first subset of predictions and the second subset of predictions indicates that the object has moved. In some embodiments, the apparatus may determine that the object has moved based on a determination that the difference between the first subset of predictions and the second subset of predictions is above a movement threshold value. For example, the apparatus may determine the difference between the first subset of predictions and the second subset of predictions based on the average of the first subset of predictions and the average of the second subset of predictions.

In some embodiments, the apparatus may determine that the second subset of predictions is valid based on a determination that the respective validity indications corresponding to the second subset of predictions indicate that an accuracy of the second subset of predictions is above a validity threshold value. For example, the apparatus may determine that the second subset of predictions is more accurate than the first subset of predictions by comparing the accuracy of the second subset of predictions to an accuracy of the first subset of predictions as indicated by the respective validity indications associated with the first subset of predictions.

In some embodiments, the apparatus may determining, based on the respective validity indications corresponding to the second subset of predictions, that the second subset of predictions is valid and select one of the first subset of predictions as the indication of the position of the object further based on a determination that the first subset of predictions is more accurate than the second subset of predictions and that a difference between the first subset of predictions and the second subset of predictions indicates that the object has not moved. In some embodiments, the apparatus may determine, based on the respective validity indications corresponding to the second subset of predictions, that the second subset of predictions is invalid and selecting one of the first subset of predictions as the indication of the position of the object.

In some embodiments, based on a determination that no change has occurred between the first statistical distribution associated with the first subset of predictions and the second statistical distribution associated with the second subset of predictions, and that a latest prediction of the multiple predictions is valid, the apparatus may be configured to further determine, based on the latest prediction and one or more other predictions of the multiple predictions, whether the object has moved (e.g., a motion of the object has occurred). Based on a determination that the object has moved, the apparatus may select the latest prediction as the indication of the position of the object.

In some embodiments, based on a determination that no change has occurred between the first statistical distribution associated with the first subset of predictions and the second statistical distribution associated with the second subset of predictions, and that the latest prediction of the multiple predictions is valid, the apparatus may be configured to further determine, based on the respective validity indications corresponding to the latest prediction and a previous prediction about the position of the object, whether the latest prediction is more accurate than the previous prediction. Based on a determination that the latest prediction is more accurate than the previous prediction, the apparatus may select the latest prediction as the indication of the position of the object.

In some embodiments, each of the respective validity indications may include at least one of a first score that indicates a confidence in the corresponding prediction or a second score that indicates a visibility of the object. In some embodiments, the first statistical distribution associated with the first subset of predictions may include a temporal distribution of the first subset of predictions or a temporal distribution of the respective validity indications corresponding to the first subset of predictions, while the second statistical distribution associated with the second subset of predictions may include a temporal distribution of the second subset of predictions or a temporal distribution of the respective validity indications corresponding to the second subset of predictions. In some embodiments, the object may include a person or a joint of the person, and the position of the object may include a triangulated three-dimensional position of the person or the joint.

BRIEF DESCRIPTION OF THE DRAWINGS

A more detailed understanding of the examples disclosed herein may be had from the following descriptions, given by way of example in conjunction with the accompanying drawings.

FIG. 1 shows a simplified block diagram of an example apparatus that may be used to perform the operations for predicting the position of an object over time as described herein.

FIGS. 2A-2C show graphs corresponding to operations associated with predicting the position of an object over time as described herein.

FIG. 3 shows a flow diagram of an example method for predicting the position of an object over time as described herein.

FIGS. 4A-4B show flow diagrams illustrating example methods for selecting a prediction of the position of an object as the best indication of the position of the object as described herein.

FIGS. 5A-5B show flow diagrams illustrating example methods for selecting a prediction of the position of an object as the best indication of the position of the object as described herein.

DETAILED DESCRIPTION

Figure 6:
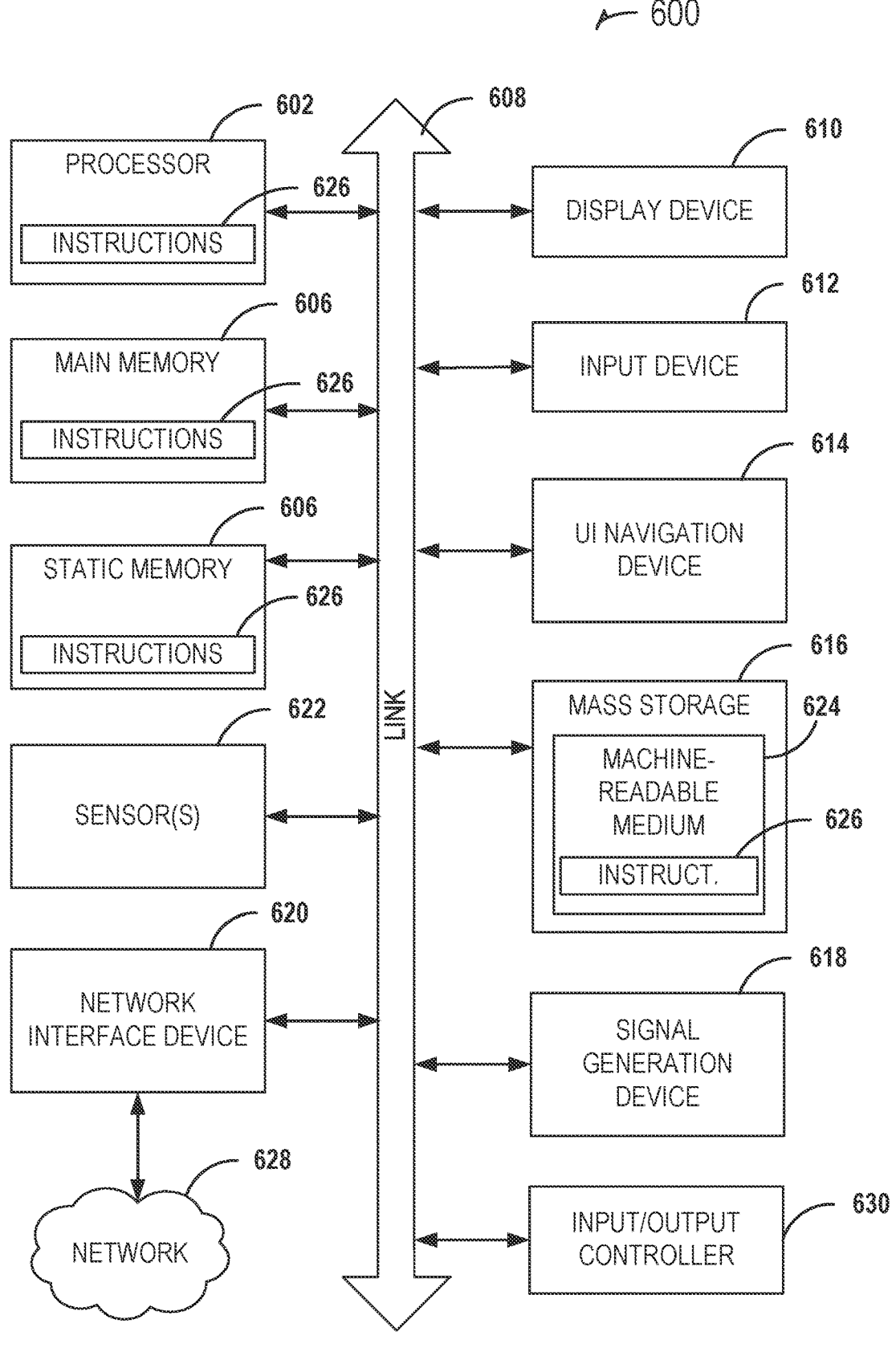
FIG. 6 is a block diagram illustrating an apparatus in the example form of a computer system, within which a set or sequence of instructions may be executed to cause the system to perform any one of the methods discussed herein.

The present disclosure is illustrated by way of example, and not by way of limitation, in the figures of the accompanying drawings. A detailed description of illustrative embodiments will be provided with reference to the figures. Although these embodiments may be described with certain technical details, it should be noted that the details are not intended to limit the scope of the disclosure. Further, while some embodiments may be described in a medical setting, those skilled in the art will understand that the techniques disclosed in those embodiments may also be applicable to other settings or use cases.

FIG. 1 shows a simplified block diagram of an example apparatus 100 that may be used to perform the operations associated with predicting the position of an object over time as described herein. Apparatus 100 may be a standalone computer system, or a networked computing resource implemented in a computing cloud. Apparatus 100 may include processing device(s) 102 and storage device(s) 104, where the storage device 104 may be communicatively coupled to processing device 102. Processing device(s) 102 may include one or more processors such as a central processing unit (CPU), a graphic processing unit (GPU), or an accelerator circuit. The storage device(s) 104 may include a memory device, a hard disc, and/or a cloud storage device connected to processing device 102 through a network interface card (not shown in FIG. 1). Processing device(s) 102 may be programmed to use historical data regarding the position of the object (e.g., obtained from storage device(s) 104 and/or some other storage device) to predict the position of the object over a time period, as described herein, via instructions 106.

The processing device(s) 102 may execute instructions 106 and perform one or more of the following operations for predicting the position of the object over a time period. At operation 108, multiple predictions about a position of an object during a time period may be obtained, wherein each of the multiple predictions may indicate the position of the object at a respective time during the time period. Throughout this disclosure, the positional candidate (e.g., prediction) for the $\mathbb{R}$ object at time t (e.g., during the time period) may be denoted as $X_t$ (e.g., $X_t \in \mathbb{R}^2$ or $X_t \in \mathbb{R}^3$ for 2D or 3D positions). For example, a medical imaging system may estimate a 3D pose of a person, as defined by the 3D position of the person's joints (e.g., the object described herein), in a scanning or surgery room. Multiple visual sensors may be placed in the room, capturing sequences of images (RGB, depth, and/or IR) of the person, which may then be processed by a computer vision algorithm (e.g., implemented by apparatus 100 or another apparatus). This algorithm may rely on the multi-sensor data to determine (e.g., via triangulation) the position of the person's joints at each time step during the time period. This data regarding the position of the joints may then be obtained by processing device(s) 102 (e.g., obtained from storage device(s) 104 or from another apparatus). However, due to a variety of factors (such as occlusion of the patient, movement of the patient, sensing errors, algorithmic uncertainty, etc.), these predications regarding the 3D position of the joints may be inaccurate and/or inconsistent over time.

At operation 110, respective validity indications corresponding to the multiple predictions may be obtained, wherein each respective validity indication may indicate an accuracy of the corresponding prediction. For example, the processing device(s) 102, or other separate automated or user-controlled processor(s), configured to provide, at each time step t, a prediction with regard to the 2D or 3D positions of the target object, may also provide a validity indication $V_t$ (e.g., scores) respectively assigned to each corresponding prediction $X_t$ in order to provide some information on the confidence/quality of the said corresponding prediction $X_t$. In some embodiments, these validity indications $V_t$ may be self-estimated by the processing device(s) 102 (and/or other separate processor(s)), or they may be assigned by a human user of the apparatus 100 (and/or the other separate processor(s)). These validity indications $V_t$ may provide some non-exhaustive information on the quality of the positional candidates $X_t$. In some embodiments, these validity indications $V_t$ may take the form of confidence scores (e.g., scores indicating the confidence about each prediction $X_t$), visibility scores (e.g., scores indicating how visible the target object(s) were at time t, where a lower visibility may indicate a lower validity of a positional candidate $X_t$), reprojection scores (e.g., scores indicating the consistency of the 3D-to-2D reprojection for 3D predictions $X_t$ that were triangulated from 2D predictions $X_t$), etc. Throughout this disclosure, the list of n validity indications (e.g., confidence scores, visibility scores, etc.) assigned to the positional candidate $X_t$ may be denoted as $V_t \in \mathbb{R}^n$ and the paired prediction/validity indication for one target object at time t may be denoted as $Z_t = (X_t, V_t)$.

At operation 112, the processing device(s) 102 may group the paired prediction values (e.g., past $Z_t$ values from the same time period) into at least 2 subsets (e.g., each corresponding to two separate "concepts" regarding the position of the target object). A first subset (e.g., $Z_{old}$) may correspond to the $Z_t$ values from a first time period and a second subset (e.g., $Z_{new}$) corresponding to the $Z_t$ values from a second time period. The processing device(s) 102 may then determine whether a change has occurred between a first statistical distribution associated with the first subset of paired predictions (e.g., $Z_{old}$) and a second statistical distribution associated with the second subset of paired predictions (e.g., $Z_{new}$). The first statistical distribution may include a temporal distribution of the first subset of predictions or a temporal distribution of the respective validity indications corresponding to the first subset of predictions, while the second statistical distribution may include a temporal distribution of the second subset of predictions or a temporal distribution of the respective validity indications corresponding to the second subset of predictions. For example, the processing device(s) 102 may apply a "concept-drift" detection algorithm to analyze the temporal distribution of the first or second subset of paired predictions $Z_t$ for each target object and determine if a change between the distributions is detected (e.g., a change in the distributions of X or V over the corresponding time period is detected between the first subset of predictions and the second subset of predictions). In some embodiments, the processing device (s) 102 may detect the change in the two distributions based on the difference between the two distributions being larger than some predefined change threshold value.

At operation 114, the apparatus 100 may, based on a determination that the change in the first statistical distribution and the second statistical distribution has occurred, select a prediction from the first subset of predictions or the second subset of predictions as an indication (e.g., a best indication) of the position of the object. As described herein, the two subsets may correspond to two separate "concepts" regarding the position of the target object. The processing device(s) 102 may compare the two subsets to determine which concept (e.g., a predicted position of the object from the first subset or from the second subset) should be selected to represent the position of the object. In some embodiments, when comparing two subsets of values, the processing device(s) 102 may aggregate the values of each subset in order to facilitate their comparison. For example, the average/mean or median value of the paired prediction values $Z_t$ of each subset may be computed.

Accordingly, the processing device(s) 102 may receive the latest paired prediction $Z_t$, memorize it (e.g., store it in storage device(s) 104), and provide a "best" paired prediction $Z_s = (X_s, V_s)$ that accounts for the previous paired prediction values $\{Z_{(t-1)}, Z_{(t-2)}, \ldots, Z_{(t-w)}\}$ (e.g., based on a memory size w for storage of position prediction values for the object(s)). The processing device(s) 102 may return $Z_s = Z_{t-\tau}$ (e.g., with $\tau \in [0, w]$) wherein the value of $\tau$ may be decided based on the comparison of the different concepts regarding the position of the object as explained above.

FIGS. 2A-2C show graphs 200A-200C illustrating operations associated with predicting the position of an object over time as described herein.

FIG. 2A shows graph 200A illustrating an operation (e.g., memory operation) associated with adding (e.g., by the processing device(s) 102 of FIG. 1) a new paired prediction result $Z_t$ to a memory configured to store paired prediction values associated with the position of the target object (e.g., the paired prediction value $Z_t$ may be added to the end of the sequence of paired prediction values after $Z_{t-1}$). As noted above, the memory used for storing the paired prediction values may include storage device(s) 104 of FIG. 1 and/or other remote storage devices.

FIG. 2B shows graph 200B illustrating an operation (e.g., memory operation) associated with obtaining subsets of the paired prediction values Z from the memory configured to store past paired prediction values associated with the position of the target object. The first subset of paired prediction values may correspond to the "old" concept associated with the position of the object $$\left(\text{e.g., } Z_{old} = \left\{z_{t-rand_i(n_s, n_w)}\right\}_{i=1}^{n_s}\right)$$

and may include a predefined number $n_s$ of paired prediction values chosen randomly from the paired prediction values. The second subset of paired prediction values may correspond to the "new" concept associated with the position of the object $$\left(\text{e.g., } Z_{new} = \left\{z_{t-i+1}\right\}_{i=1}^{n_s}\right)$$

and may include the same predefined number $n_s$ of paired prediction values (e.g., so the two subsets have an equal number of values to be compared) chosen from the latest paired prediction values.

FIG. 2C shows graph 200C illustrating an operation (e.g., a memory operation) associated with obtaining the current best paired prediction value $Z_s$ and the latest paired prediction value $Z_t$ from the memory that stores past paired prediction values associated with the position of the target object. As described more fully below with respect to the methods 500A and 500B of FIGS. 5A and 5B respectively, if no change is detected in the temporal distribution of the paired prediction values, the processing device(s) 102 may obtain the current values of the best paired prediction $Z_s$ and of the latest paired prediction $Z_t$.

FIG. 3 shows a flow diagram of an example method 300 (e.g., implemented by processing device(s) 102 of FIG. 1) for predicting the position of an object over time as described herein.

Method 300 may include obtaining, at 302, multiple predictions about a position of an object during a time period, wherein each of the multiple predictions may indicate the position of the object at a respective time during the time period (e.g., the position may be a triangulated 3D position of a person's joint). As noted above, a medical imaging system may need to estimate a 3D pose of a person, as defined by the 3D position of the person's joints (e.g., objects), in a scanning or surgery room. The data regarding the position of the joints may then be provided to storage device(s) 104 of FIG. 1 so that it may be obtained by processing device(s) 102. Also as noted above, the positional candidate (e.g., prediction) for one object at time t (e.g., during the time period) may be denoted as $X_t$ (e.g., $X \in \mathbb{R}^2$ or $X_t \in \mathbb{R}^3$ for 2D or 3D positions).

Method 300 may further include, at 304, obtaining respective validity indications corresponding to the multiple predictions, wherein each respective validity indication may indicate an accuracy of the corresponding prediction. As noted above, the processing device(s) 102, or other separate automated or user-controlled processor(s), configured to provide, at each time step t, predictions with regard to the 2D or 3D positions of the target object(s), may also provide validity indications $V_t$ (e.g., scores) respectively assigned to each corresponding prediction $X_t$ in order to provide some information on the confidence/quality of the said corresponding prediction $X_t$. In some embodiments, these validity indications $V_t$ may take the form of confidence scores (e.g., scores indicating the confidence of each prediction $X_t$), visibility scores (e.g., scores indicating how visible the target object(s) were at time t, where a lower visibility may indicate a lower validity of a positional candidate $X_t$), reprojection scores (e.g., scores indicating the consistency of the 3D-to-2D reprojection for 3D predictions $X_t$ that were triangulated from 2D predictions $X_t$), etc.

At 306, method 300 may include selecting a first subset of predictions and a second subset of predictions from the multiple predictions obtained at 302, and determining whether a change has occurred between a first statistical distribution associated with the first subset of predictions and a second statistical distribution associated with the second subset of predictions (e.g., the statistical distributions may include respective temporal distributions of the two subsets of predictions or the respective validity indications corresponding to the subsets of predictions). For example, the first subset of predictions (e.g., $Z_{old}$ including $X_{old}$ and $V_{old}$) may be associated with a first time period, and the second subset of predictions (e.g., $Z_{new}$, including $X_{new}$, and $V_{new}$) associated with a second time period. As noted above, the first subset of paired prediction values may correspond to the "old" concept associated with the position of the object $$\left(\text{e.g., } Z_{old} = \{z_{t-rand_i(n_s, n_w)}\}_{i=1}^{n_s}\right)$$

and may include a predefined number $n_s$ of paired prediction values chosen randomly from the paired prediction values. Also as noted above, the second subset of paired prediction values may correspond to the "new" concept associated with the position of the object $$\left(\text{e.g., } Z_{new} = \{z_{t-i+1}\}_{i=1}^{n_s}\right)$$

and may include the same predefined number $n_s$ of paired prediction values chosen randomly from the paired prediction values (e.g., so the two subsets have an equal number of values to be compared). In examples, the processing device(s) 102 may perform a "concept-drift" based determination to analyze the respective temporal distributions of the two subsets of paired predictions and determine if a change in the distributions is detected (e.g., a difference in the distributions being above a threshold value). As noted above, when comparing the two subsets of values, the processing device(s) 102 may aggregate the values of each subset in order to facilitate their comparison. For example, the change in the temporal distributions may be detected based on the following:

$$dist(Z_{old}, Z_{new}) > \sqrt{\frac{-\ln \alpha}{n_s}},$$

wherein dist( ) may represent a statistical distance between the subsets of paired prediction values $Z_{old}$ and $Z_{new}$. In examples, such a statistical distance may be determined based on a predefined probability a (e.g., for a Kolmogorov-Smirnov test (K-S test or KS test) of the equality of probability distributions) and the predefined number of values $n_s$ for each of the subsets.

At 308, based on a determination that the change has occurred between the first and second statistical distributions described above, method 300 may proceed to 310, where a prediction from the first subset of predictions or the second subset of predictions may be selected as the indication (e.g., a best indication) of the position of the object. As noted above, the processing device(s) 102 may compare the two subsets (e.g., $Z_{old}$ and $Z_{new}$) in order to determine which concept (e.g., a predicted position of the object from the first subset or from the second subset) should be selected. The selection may be made, for example, by computing average position and validity values for each subset:

$$avgZ_{old} = \frac{1}{n_s} \sum_{i=1}^{n_s} Z_{old}^i \text{ and } Z_{new} = \frac{1}{n_s} \sum_{i=1}^{n_s} Z_{new}^i$$

and then comparing the averages.

As explained with respect to FIGS. 4A-4B below, if the second subset of prediction values (e.g., $Z_{new}$) are deemed valid (e.g., based on the validity indication values and a validity threshold value) and if the difference between the first subset $Z_{old}$ and the second subset $Z_{new}$ is large enough to suspect that the target object has moved (e.g., based on a movement threshold value), or if the second subset of prediction values are deemed more accurate than the first subset of prediction values (e.g., based on a comparison of respective validity indication values), the method 300 may return a result (e.g., the best result) from the second subset $Z_{new}$. Otherwise, if the second subset of prediction values is not deemed valid (e.g., based on the validity indication values and the validity threshold value), or if no motion is suspected (e.g., based on the movement threshold value) and the first subset of prediction values is deemed more accurate (e.g., based on a comparison of respective validity indication values), the method 300 may return the same result as the previous timestep. In some embodiments, the movement threshold value (e.g., distance) for detecting object motion may be a predefined constant for each or all target objects or may be defined relative to other properties of the target object and corresponding predictions. For example, the threshold value may be a multiple of the standard deviation of past prediction results.

Furthermore, as explained with respect to FIGS. 5A-5B below, if no change in the temporal distribution of the two subsets of paired predictions is detected, method 300 may still compare the latest paired prediction $Z_t$ with the previously returned best paired prediction $Z_s$. If $Z_t$ is deemed valid, and if a motion of the object since last time step is suspected or if $Z_t$ is deemed more accurate, then method 300 may switch to $Z_t$ ($Z_s \leftarrow Z_t$) and return its value as the indication (e.g., best indication) of the position of the object. Otherwise, method 300 may simply return the same result $Z_s$ as returned in the previous timestep.

FIGS. 4A-4B show flow diagrams illustrating example methods 400A and 400B for selecting a prediction of the position of an object as an indication (e.g., the best indication) of the position of the object as described herein.

FIG. 4A illustrates the method 400A, which may continue, at 402A, from operation 310 of method 300 shown in FIG. 3 (e.g., associated with selecting a prediction from the first subset of predictions or the second subset of predictions as an indication of the position of the object). As shown in FIG. 4A, method 400A may include determining, at operation 404A, that the second subset of predictions is valid based on the respective validity indications corresponding to the second subset of predictions. For example, the validity may be evaluated based on criteria such as confidence scores (e.g., scores indicating the confidence of the processing device(s) 102, or other separate processor(s), with regard to each prediction $X_t$), visibility scores (e.g., scores indicating how visible the target object(s) were at time t, with a lower visibility indicating a lower validity of a positional candidate $X_t$), reprojection scores (e.g., scores indicating the consistency of the 3D-to-2D reprojection for 3D predictions $X_t$ that were triangulated from 2D predictions $X_t$), etc. If one of the subsets (e.g., the second subset $Z_{new}$) does not meet the validity threshold value with respect to any of the criteria, the subset may be deemed invalid and a prediction value (e.g., best prediction value) from the other subset (e.g., the first subset $Z_{old}$) may be returned.

At 406A, method 400A may further include selecting one of the second subset of predictions as the indication of the position of the object based on a further determination that the second subset of predictions is more accurate than the first subset of predictions (e.g., based on comparing the respective validity indication values $V_t$ corresponding to each of the position prediction values $X_t$ for each subset), or that a difference between the first subset of predictions and the second subset of predictions indicates that the object has moved (e.g., based on the difference between the position prediction values being greater than the movement threshold value). For example, the position prediction value may be selected from the second subset (e.g., $Z_{new}$) based on the following: $Z_s \leftarrow Z_t$ w/$\tau$=argmax $V_{t-i+1}$ wherein i$\in$[1, n].

FIG. 4B illustrates the method 400B, which may continue, at 402B, from operation 310 of method 300 shown in FIG. 3 (e.g., associated with selecting a prediction from the first subset of predictions or the second subset of predictions as an indication of the position of the object).

As shown in FIG. 4B, method 400B may include determining, at 404B, that the second subset of predictions is valid based on the respective validity indications corresponding to the second subset of predictions. As noted above, the validity may be evaluated based on several criteria (e.g., confidence scores, visibility scores, reprojection scores, etc.), and if a subset does not meet the validity threshold value with respect to any of the criteria, the subset may be deemed invalid. At 406B, method 400B may further include selecting a prediction from the first subset of predictions as the indication (e.g., the best indication) of the position of the object based on a further determination that the first subset of predictions is more accurate than the second subset of predictions (e.g., based on comparing the respective validity indication values $V_t$ corresponding to each of the position prediction values $X_t$ for each subset), and that a difference between the first subset of predictions and the second subset of predictions indicates that the object has not moved (e.g., based on the difference between the position prediction values being less than the movement threshold value).

FIGS. 5A-5B show flow diagrams illustrating example methods 500A and 500B for selecting a prediction of the position of an object as an indication (e.g., the best indication) of the position of the object when no change in the distribution of the predictions or the validation indications is detected as described herein.

FIG. 5A shows the method 500A, which may include determining, at 502A, that no change between the respective statistical distributions associated with a first subset of predictions and a second subset of predictions has occurred, and that the latest prediction of the multiple predictions is valid. Method 500A may further include determining, at 504A, whether the object has moved (e.g., whether a motion of the object has occurred) based on the latest prediction and one or more other predictions of the multiple predictions. As noted above, the movement of the object may be determined by comparing the respective position prediction values of the latest prediction and one or more other predictions to determine whether the difference between the values is greater than a movement threshold value. At 506A, method 500A may further include selecting the latest prediction as the best indication of the position of the object based on a determination that the object has moved (e.g., based on the difference between the respective position prediction values of the latest prediction and the one or more other predictions being greater than the movement threshold value).

FIG. 5B shows the method 500B, which may include determining, at 502B, that no change between the respective statistical distributions associated with a first subset of predictions and a second subset of predictions has occurred, and that the latest prediction of the multiple predictions is valid. The method 500B may further include determining, at 504B, whether the latest prediction $Z_t$ is more accurate than a previous prediction (e.g., the previously determined best prediction) $Z_s$. Such a determination may be made, for example, based on the respective validity indications $V_t$ and $V_s$ corresponding to the latest prediction $Z_t$ and the previous prediction $Z_s$ about the position of the object. As noted above, the respective validation (or accuracy) of the predictions may be compared by comparing the respective validity indication values $V_t$ and $V_s$ (e.g., which score(s) are higher).

At 506B, the method 500B may include selecting the latest prediction as an indication (e.g., the best indication) of the position of the object based on a determination that the latest prediction is more accurate than the previous prediction (e.g., based on the validity indication value $V_t$ being greater than the validity indication value $V_s$).

For simplicity of explanation, the operations of the methods (e.g., performed by apparatus 100 of FIG. 1) are depicted and described herein with a specific order. It should be appreciated, however, that these operations may occur in various orders, concurrently, and/or with other operations not presented or described herein. Furthermore, it should be noted that not all operations that apparatus 100 is capable of performing are depicted in FIGS. 3, 4A-4B and 5A-5B or described herein. It is also noted that not all illustrated operations may be required to be performed.

FIG. 6 is a block diagram illustrating an apparatus in the example form of a computer system 600, within which a set or sequence of instructions may be executed to cause the system to perform any one of the methods discussed herein.

The apparatus may operate as a standalone device or may be connected (e.g., networked) to other machines or devices. In a networked deployment, the apparatus may operate in the capacity of either a server or a client machine in server-client network environments, or it may act as a peer machine in peer-to-peer (or distributed) network environments. The apparatus may be a wearable device, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single apparatus is illustrated, the term "apparatus" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein (e.g., method 300 of FIG. 3, methods 400A and 400B of FIGS. 4A-4B and methods 500A and 500B of FIGS. 5A-5B).

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors 622, such as a global positioning system (GPS) sensor, accelerometer, gyro meter, magnetometer, or other such sensor.

The storage device 616 includes a machine-readable medium 624 on which is stored one or more sets of data structures and instructions 626 (e.g., software) embodying or utilized by any one or more of the methodologies or functions described herein. The instructions 626 may also reside, completely or at least partially, within the main memory 604, static memory 606, and/or within the processor 602 during execution thereof by the computer system 600, with main memory 604, static memory 606, and the processor 602 comprising machine-readable media.

While the machine-readable medium 624 is illustrated in an example embodiment to be a single medium, the term "machine-readable medium" may include a single medium or multiple media (e.g., a centralized or distributed database, and/or associated caches and servers) that store the one or more instructions 626. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 626 may further be transmitted or received over a communications network 628 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 16G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 600 may also include an input/output controller 630 to receive input and output requests from at least one central processor 602, and then send device-specific control signals to the device they control. The input/output controller 630 may free at least one central processor 602 from having to deal with the details of controlling each separate kind of device.

The term "computer-readable storage medium" used herein may include any tangible medium that is capable of storing or encoding a set of instructions for execution by a computer that cause the computer to perform any one or more of the methods described herein. The term "computer-readable storage medium" used herein may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:
1. An apparatus, comprising:
a processor configured to:
  obtain multiple predictions about a position of an object during a time period, wherein each of the multiple predictions indicates the position of the object at a respective time during the time period;
  obtain respective validity indications corresponding to the multiple predictions, wherein each respective validity indication indicates an accuracy of the corresponding prediction;

select a first subset of predictions and a second subset of predictions from the multiple predictions;

determine whether a change has occurred between a first statistical distribution associated with the first subset of predictions and a second statistical distribution associated with the second subset of predictions; and based on a determination that the change has occurred between the first statistical distribution and the second statistical distribution:

determine that the second subset of predictions is valid based on a determination that the respective validity indications corresponding to the second subset of predictions indicate that an accuracy of the second subset of predictions is above a validity threshold value; and select a prediction from the second subset of predictions as an indication of the position of the object based on a determination that the second subset of predictions is more accurate than the first subset of predictions, or that a difference between the first subset of predictions and the second subset of predictions indicates that the object has moved.

2. The apparatus of claim 1, wherein the processor is configured to determine that the object has moved based on a determination that the difference between the first subset of predictions and the second subset of predictions is above a movement threshold value.

3. The apparatus of claim 2, wherein the processor is configured to determine the difference between the first subset of predictions and the second subset of predictions by comparing the average of the first subset of predictions and the average of the second subset of predictions.

4. The apparatus of claim 1, wherein the processor is configured to determine that the second subset of predictions is more accurate than the first subset of predictions by comparing the accuracy of the second subset of predictions as indicated by the respective validity indications associated with the second subset of predictions to an accuracy of the first subset of predictions as indicated by the respective validity indications associated with the first subset of predictions.

5. The apparatus of claim 1, wherein, based on the determination that the change has occurred between the first statistical distribution and the second statistical distribution, the processor is further configured to select one of the first subset of predictions as the indication of the position of the object further based on a determination that the first subset of predictions is more accurate than the second subset of predictions, and that a difference between the first subset of predictions and the second subset of predictions indicates that the object has not moved.

6. The apparatus of claim 1, wherein, based on the determination that the change has occurred between the first statistical distribution and the second statistical distribution, the processor is further configured to:

determine, based on the respective validity indications corresponding to the second subset of predictions, that the second subset of predictions is invalid; and select one of the first subset of predictions as the indication of the position of the object.

7. The apparatus of claim 1, wherein, based on a determination that no change has occurred between the first statistical distribution and the second statistical distribution, and that a latest prediction of the multiple predictions is valid, the processor is further configured to:

determine, based on the latest prediction and one or more other predictions of the multiple predictions, whether the object has moved; and based on a determination that the object has moved, select the latest prediction as the indication of the position of the object.

8. The apparatus of claim 1, wherein, based on a determination that no change has occurred between the first statistical distribution and the second statistical distribution, and that a latest prediction of the multiple predictions is valid, the processor is further configured to:

determine, based on the respective validity indications corresponding to the latest prediction and a previous prediction about the position of the object, whether the latest prediction is more accurate than the previous prediction; and select the latest prediction as the indication of the position of the object based on a determination that the latest prediction is more accurate than the previous prediction.

9. The apparatus of claim 1, wherein each of the respective validity indications corresponding to the multiple predictions includes at least one of a first score that indicates a confidence in the corresponding prediction or a second score that indicates a visibility of the object when the corresponding prediction is made.

10. The apparatus of claim 1, wherein the first statistical distribution associated with the first subset of predictions includes a temporal distribution of the first subset of predictions or a temporal distribution of the respective validity indications corresponding to the first subset of predictions, and wherein the second statistical distribution associated with the second subset of predictions includes a temporal distribution of the second subset of predictions or a temporal distribution of the respective validity indications corresponding to the second subset of predictions.

11. The apparatus of claim 1, wherein the object includes a person or a joint of the person, and wherein the position of the object includes a triangulated three-dimensional position of the person or the joint.

12. A method for predicting a position of an object, comprising:

obtaining multiple predictions about a position of an object during a time period, wherein each of the multiple predictions indicates the position of the object at a respective time during the time period;

obtaining respective validity indications corresponding to the multiple predictions, wherein each respective validity indication indicates an accuracy of the corresponding prediction;

selecting a first subset of predictions and a second subset of predictions from the multiple predictions;

determining whether a change has occurred between a first statistical distribution associated with the first subset of predictions and a second statistical distribution associated with the second subset of predictions; and based on a determination that the change has occurred between the first statistical distribution and the second statistical distribution:

determining that the second subset of predictions is valid based on a determination that the respective validity indications corresponding to the second subset of predictions indicate that an accuracy of the second subset of predictions is above a validity threshold value; and selecting a prediction from the second subset of predictions as an indication of the position of the object in response to determining that the second subset of predictions is more accurate than the first subset of predictions, or that a difference between the first subset of predictions and the second subset of predictions indicates that the object has moved.

13. The method of claim 12, wherein, based on the determination that the change has occurred between the first statistical distribution and the second statistical distribution, selecting one of the first subset of predictions as the indication of the position of the object in response to determining that the first subset of predictions is more accurate than the second subset of predictions, and that a difference between the first subset of predictions and the second subset of predictions indicates that the object has not moved.

14. The method of claim 12, further comprising, based on a determination that the change has occurred between the first statistical distribution and the second statistical distribution:

determining, based on the respective validity indications corresponding to the second subset of predictions, that the second subset of predictions is invalid; and selecting one of the first subset of predictions as the indication of the position of the object.

15. The method of claim 12, wherein, based on a determination that no change has occurred between the first statistical distribution and the second statistical distribution, and that a latest prediction of the multiple predictions is valid, the method further comprises:

determining, based on the latest prediction and one or more other predictions of the multiple predictions, whether the object has moved; and based on a determination that the object has moved, selecting the latest prediction as the indication of the position of the object.

16. The method of claim 12, wherein, based on a determination that no change has occurred between the first statistical distribution and the second statistical distribution, and that a latest prediction of the multiple predictions is valid, the method further comprises:

determining, based on the respective validity indications corresponding to the latest prediction and a previous prediction about the position of the object, whether the latest prediction is more accurate than the previous prediction; and selecting the latest prediction as the indication of the position of the object based on a determination that the latest prediction is more accurate than the previous prediction.

17. The method of claim 12, wherein the first statistical distribution associated with the first subset of predictions includes a temporal distribution of the first subset of predictions or a temporal distribution of the respective validity indications corresponding to the first subset of predictions, and wherein the second statistical distribution associated with the second subset of predictions includes a temporal distribution of the second subset of predictions or a temporal distribution of the respective validity indications corresponding to the second subset of predictions.

* * * * *